US006618563B2

(12) United States Patent
(10) Patent No.: US 6,618,563 B2
(45) Date of Patent: Sep. 9, 2003

Oakeson et al.

(54) SYSTEM AND METHOD FOR PRINTING ON A PRINT MEDIUM WITH A COMBINATION LASER AND INK JET PRINTER

(75) Inventors: Kenneth L. Oakeson, Boise, ID (US); Terry P. Mahoney, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/776,048

(22) Filed: Feb. 2, 2001

(65) Prior Publication Data

US 2002/0106208 A1 Aug. 8, 2002

(51) Int. Cl.[7] ........................ G03G 15/00; H04N 1/034; B41J 23/00

(52) U.S. Cl. .................................. 399/2; 347/3; 347/37

(58) Field of Search ............................. 399/2; 347/3, 8, 347/37

(56) References Cited

U.S. PATENT DOCUMENTS

| | | | | | |
|---|---|---|---|---|---|
| 3,678,277 | A | * | 7/1972 | Greenspan et al. | 347/232 |
| 4,283,731 | A | * | 8/1981 | Bok et al. | 347/4 |
| 4,296,317 | A | * | 10/1981 | Kraus | 347/3 X |
| 5,208,610 | A | * | 5/1993 | Su et al. | 347/37 X |
| 5,313,256 | A | * | 5/1994 | Bov et al. | 399/2 |
| 5,373,350 | A | * | 12/1994 | Taylor et al. | 399/2 OR |
| 5,410,136 | A | * | 4/1995 | McIntire et al. | 399/2 X |
| 5,547,501 | A | * | 8/1996 | Maruyama et al. | 347/100 X |
| 5,570,451 | A | * | 10/1996 | Sakaizawa et al. | 399/2 OR |
| 5,729,785 | A | * | 3/1998 | Sakaizawa et al. | 399/2 OR |
| 6,050,664 | A | * | 4/2000 | Wilson | 347/8 OR |
| 6,172,689 | B1 | * | 1/2001 | Cunnagin et al. | 347/8 OR |

* cited by examiner

*Primary Examiner*—Fred L Braun

(57) ABSTRACT

A system and method are provided for printing a code on a print medium. In one embodiment, the system includes a laser printing assembly within a printer for printing on a print medium. The system also includes an ink jet head assembly attached to a printer structure of the printer for printing a code or other information on the print medium. The ink jet head assembly may be immovably or adjustably attached to the printer structure. The ink jet head assembly may be immovably attached to the printer, for example, by affixing the ink jet head assembly directly to the printer structure or by using a bracket to mount the ink jet head assembly to the printer structure. There are also several alternatives that may be employed to adjustably attach the ink jet head assembly to the printer structure including, for example, a slide assembly, a telescopic assembly, or a swivel arm assembly as well as other suitable adjustable attaching approaches.

13 Claims, 5 Drawing Sheets

SYSTEM AND METHOD FOR PRINTING ON A PRINT MEDIUM WITH A COMBINATION LASER AND INK JET PRINTER

TECHNICAL FIELD

The present invention is generally related to the field of printing and, more particularly, is related to a system and method for printing a code, for example, on a print medium.

BACKGROUND OF THE INVENTION

In the field of printing, it is sometimes necessary to print a code or other information onto documents for future recognition. The code may be, for example, a bar code, a word having a number of characters, or other such code. For example, a unique code may be placed on a test paper given to a particular student for identification. The list of applications for this type of printing is endless.

Unfortunately, current printing technology does not print such codes or other information on various print media in an optimum manner. For example, printers are typically limited to printing any code or other information within a predefined print area defined by minimum margins on a print media. Consequently, individuals are kept from printing at the edges of a print medium. Also, many printers are monochromatic allowing printing only in a single color, typically black. This means that any code printed on a print medium is plainly visible and may clutter the appearance of the resulting document. Color printing provides color alternatives as well as invisible inks, but at significant cost that is not justified when a user wishes to print a special code or other information at a uniform position on each page printed.

SUMMARY OF THE INVENTION

In light of the forgoing, the present invention provides for a system and method for printing a code on a document. In one embodiment, the system includes a laser printing assembly within a printer for printing on a print medium. The system also includes an ink jet head assembly attached to a printer structure of the printer for printing a code or other information on the print medium. The ink jet head assembly may be immovably or adjustably attached to the printer structure. The ink jet head assembly may be immovably attached to the printer, for example, by affixing the ink jet head assembly directly to the printer structure or by using a bracket to mount the ink jet head assembly to the printer structure.

The present invention also provides several alternatives to adjustably attach the ink jet head assembly to the printer structure. In particular several approaches may be employed that include the use of, for example, a slide assembly, a telescopic assembly, or a swivel arm assembly as well as other suitable adjustable attaching approaches.

In one embodiment, the method includes the steps of: providing a laser printing assembly within a printer to print on the print medium, printing on the print medium with the laser printing assembly, attaching an ink jet head assembly to a printer structure of the printer, and printing on the print medium with the ink jet head assembly. The step of attaching the ink jet head assembly to the printer structure of the printer further comprises, for example, the step of immovably attaching the ink jet head assembly to the printer structure. Also, the step of attaching an ink jet head assembly to the printer structure further comprises, for example, the step of adjustably attaching the ink jet head assembly to the printer structure.

The system and method of the present invention provide several advantages such as, for example, the fact that an ink may be employed to place a desired code or other information onto a print medium that differs in color from the base ink or toner employed to place the images on the print medium by, for example, a laser printing assembly. For example, such codes may be created with invisible, magnetic, or other machine-readable ink that is transparent to the user and, consequently, results in less clutter on the print medium. In addition, the ink jet head assembly may be adjustably placed at any position along the entire width of the print medium. Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
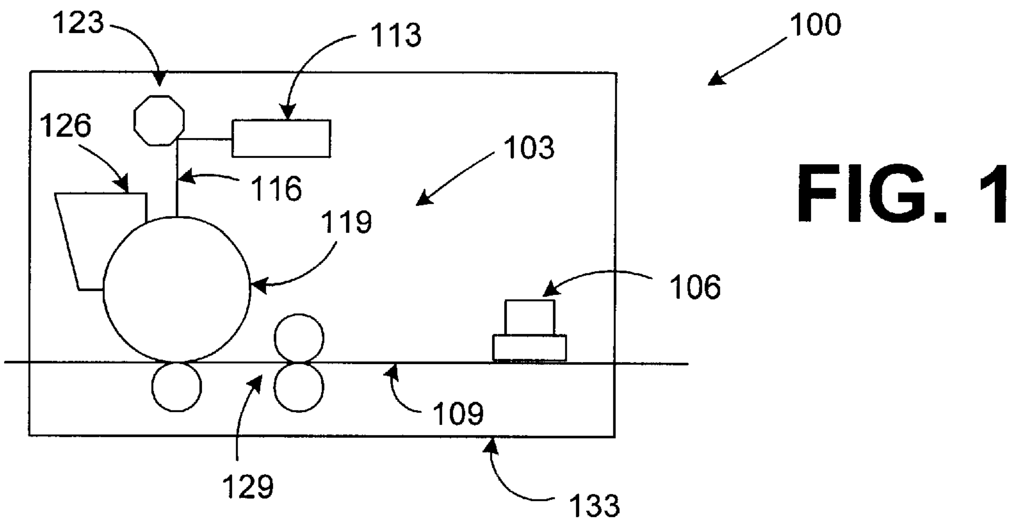
FIG. 1 is a block diagram of a printer according to an embodiment of the present invention.

With reference to FIG. 1, shown is a printer 100 according to an embodiment of the present invention. The printer 100 includes a laser printing assembly 103 and an inkjet head assembly 106. The laser printing assembly 103 and the inkjet head assembly 106 are employed to print images onto a print media 109 such as, for example, a sheet of paper, envelope, document, etc. The laser printing assembly 103 employs a laser 113 that generates a laser beam 116 that is directed to a photoconductive drum 119. A spinning polygonal mirror 123 is employed to distribute the laser beam 116 in a scanning motion onto the photoconductive 119 as is generally known by those skilled in the art. A toner cartridge 126 is mated with the photoconductive drum 119 that receives the toner in the form of an image that is then transferred onto the print media 109 as is generally known by those with ordinary skill in the art.

The laser printing assembly 103 also includes a toner fusing assembly 129 that is employed to fuse the toner to the print media 109 after it has been deposited using the photoconductive drum 119. The print media 109 moves along a print media pathway that is guided by various rollers and other such devices. The print media 109 is passed near the ink jet head assembly 106 that also is capable of printing an image on the print media 109. Alternatively, the ink jet head assembly 106 may be placed before the laser printing assembly 103. The laser printing assembly 103 and the ink jet head assembly 106 are all ultimately attached to a printer structure 133 that may be, for example, a printer chassis or other such structural member.

Next, a discussion of the operation of the printer 100 is provided. To begin, the print media 109 is fed through the laser printing assembly 103 thereby placing text/image(s) on the print media 109. The print media 109 then continues along the print medium pathway and is exposed to the ink jet head assembly 106 where a second image such as, for example, a code or other information may be placed on the print media 109. The ink jet head assembly 106 is attached to the printer structure 133 in a manner such that it does not move during the printing of the print media 109. In this manner, the ink jet head assembly 106 may be employed in a limited manner to place, for example, a code or other such information onto the print media 109 at a specific location on the print media 109 that is within the reach of the ink jet head assembly 106.

Figure 2A:
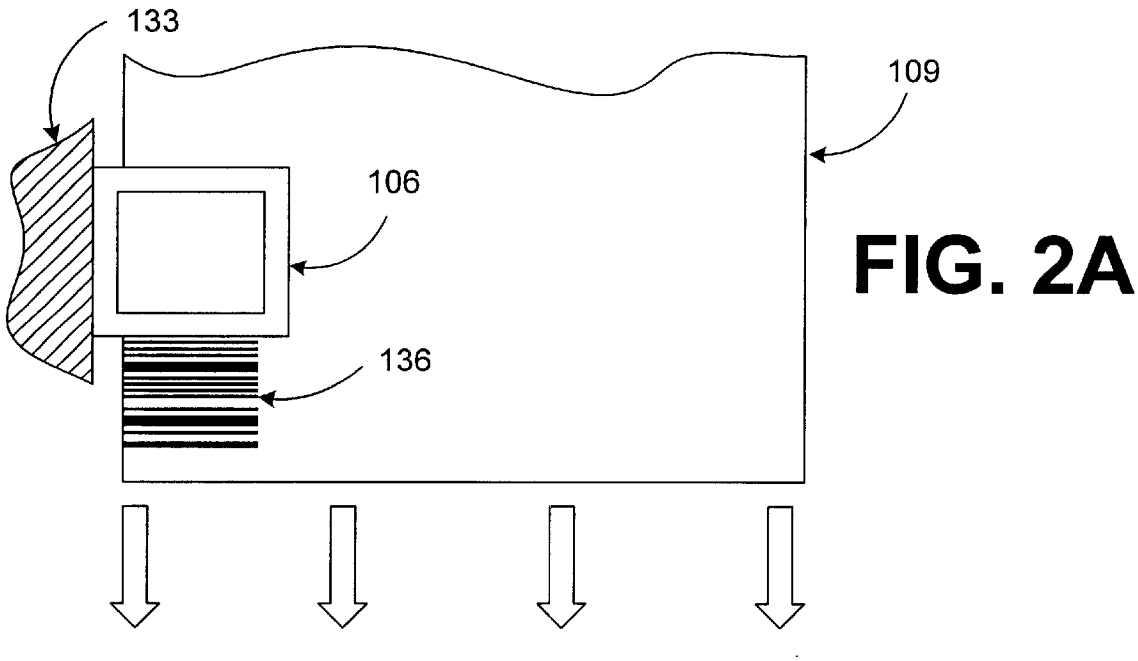
FIG. 2A is a top view of a print head assembly immovably attached to a printer structure of the printer of FIG. 1.
Figure 2B:
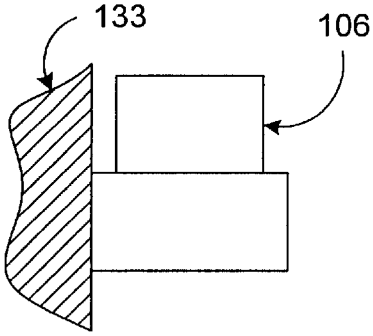
FIG. 2B is a side view of a print head assembly immovably attached to a printer structure of the printer of FIG. 1.

With reference to FIG. 2A, shown is a top view of the ink jet head assembly 106 that is attached to the printer structure 133. The ink jet head assembly includes an ink jet cartridge that fits within a cartridge holder as is generally known by those with ordinary skill in the art. As shown, the ink jet head assembly 106 is immovably attached to the printer structure 133 by affixing the ink jet head assembly 106 directly to the printer structure 133. As discussed herein, the term "affixing" means to join two assemblies, components and/or structures, for example, by fastening, welding, bonding, clamping, fusing, or otherwise joining using, for example, nuts and bolts, screws, rivets, adhesive, cement, buckles, clamps, binding clips, clipping assemblies or other suitable mechanism(s). As shown in FIG. 2A, by attaching the ink jet head assembly 106 directly to the printer structure 133, the ink jet head assembly 106 is immovably attached such that it can only be exposed to a specific column on the print media 109. The ink jet head assembly 106 is employed to create a code 136 on the print medium 109. The code 136 is created along a strip of the print medium 109 that is exposed to the ink jet head assembly 106 and to which the ink jet head assembly 106 can print. With reference to FIG. 2B, shown is a side view of the ink jet head assembly 106 as it is attached to the printer structure 133.

Figure 3A:
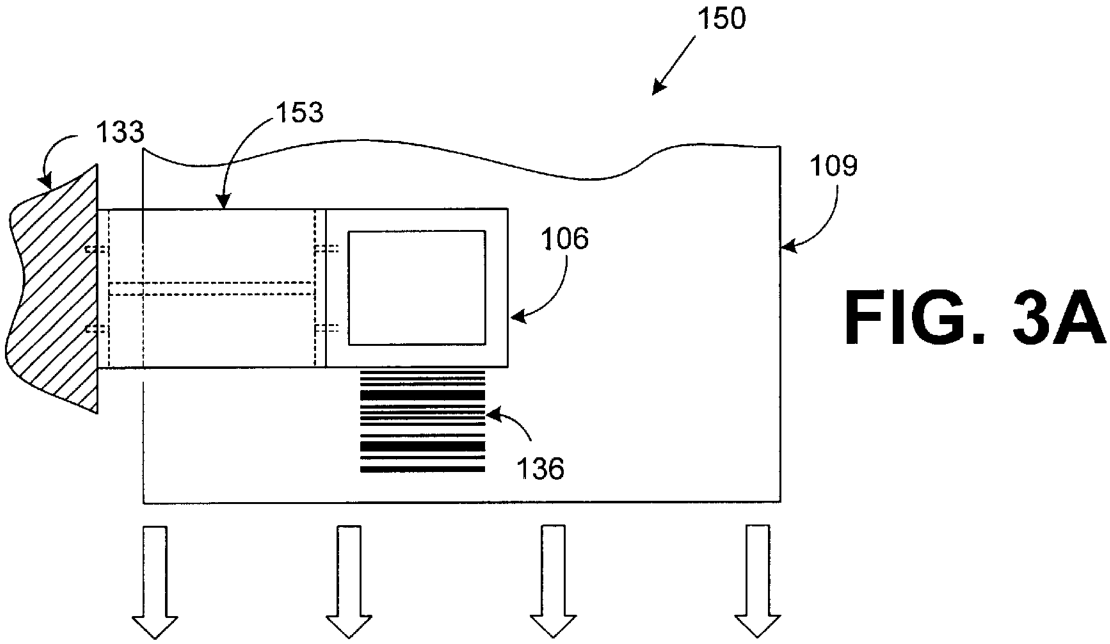
FIG. 3A is a top view of a print head assembly immovably attached to a printer structure of the printer of FIG. 1 with a bracket.
Figure 3B:
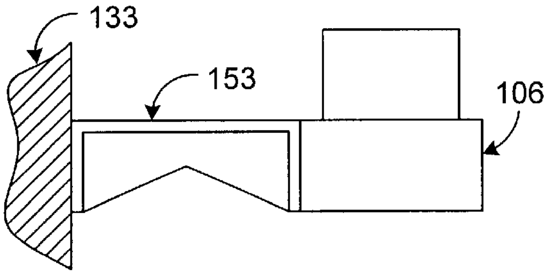
FIG. 3B is a side view of the print head assembly and the bracket of FIG. 3A.

With reference to FIG. 3A, shown is a top view of a bracket mount approach 150 that may be employed to attach the ink jet head assembly 106 to the printer structure 133. The bracket mount approach 150 includes a bracket 153. At one end, the bracket 153 is affixed to the printer structure 133. At the other end, the bracket 153 is affixed to the ink jet head assembly 106. The bracket 153 may be variable in length. Depending on the length of the bracket 153, the ink jet head assembly 106 may be exposed to a column of the print medium 109 at any position along the entire width of the print medium 109. Note that as an alternative, a second or more brackets 153 may be employed in addition to the bracket 153 as shown to attach the ink jet head assembly 106 to the printer structure 133. With reference to FIG. 3B, shown is a side view of the bracket mount approach 150 that further illustrates the bracket 153 as it is affixed to both the printer structure 133 and the ink jet head assembly 106.

Figure 4A:
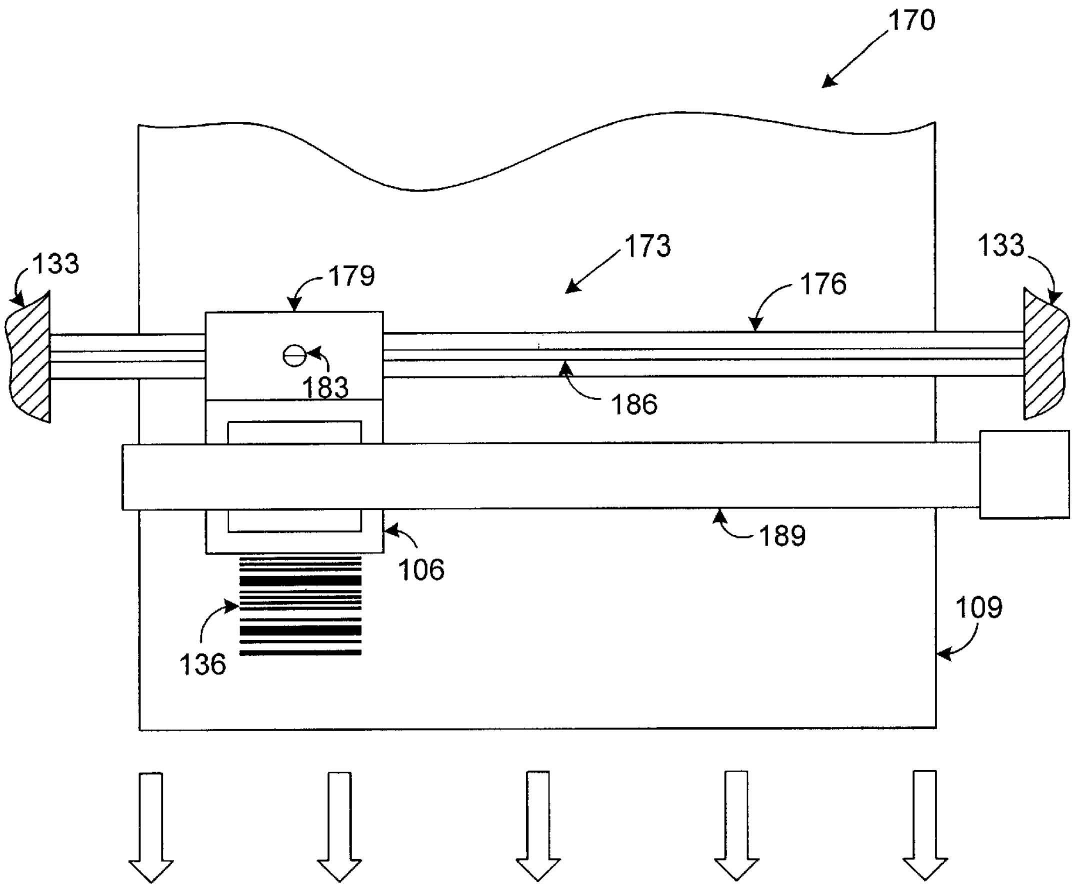
FIG. 4A is a top view of a print head assembly adjustably attached to the printer structure of the printer of FIG. 1 with a slide assembly.

With reference to FIG. 4A, shown is a top view of a slide mount approach 170 according to another aspect of the present invention. The slide mount approach 170 includes a slide assembly 173 that adjustably attaches the ink jet head assembly 106 to the printer structure 133. The slide assembly 173 includes a slide mechanism 176 and a slide 179. The slide mechanism 176 may be, for example, a rod or bar with a cross section that is in the shape of a circle, square, or other appropriate shape. The slide mechanism 176 is affixed to the printer structure 133 either at one or both ends. The slide 179 is adjustably attached to the slide mechanism 176 in that it may glide back and forth along with slide mechanism 176. The slide 179 may be fixed in a particular position along the slide mechanism 176 by means of a set screw 183, for example, that contacts the slide mechanism 176 within a groove 186. Alternatively, a different set mechanism other than the set screw 183 and groove 186 may be employed, such as, for example, a clamp, or other such device.

Figure 4B:
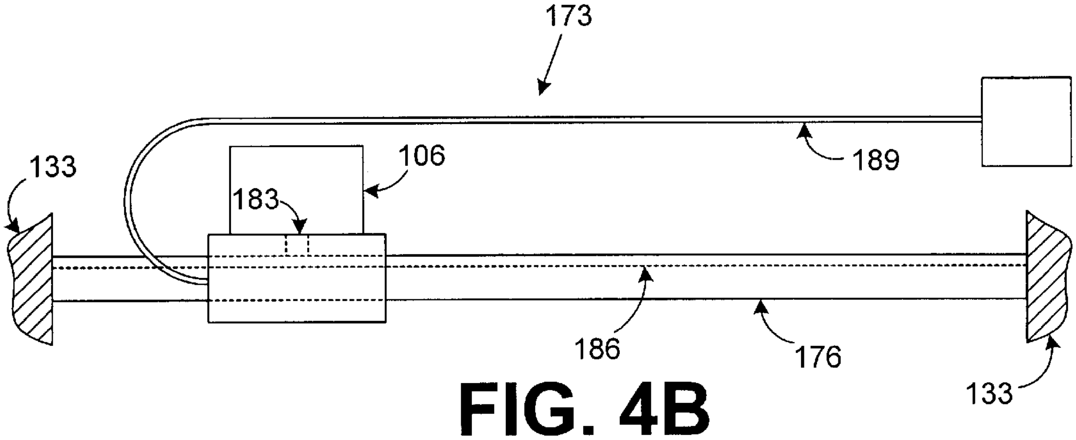
FIG. 4B is a side view of the print head assembly and slide assembly of FIG. 4A.

The slide assembly 173 also includes a cable 189 such as, for example, a ribbon cable that couples electrical signals to and from the ink jet head assembly 106 as is generally known by those with ordinary skill in the art. The cable 189 allows for the easy movement of the slide 179 along the slide mechanism 176. When the printer 100 (FIG. 1) is in use, the slide 179 is attached to a specific position along the slide mechanism 176 using the appropriate set mechanism. In this manner, the ink jet head assembly 106 may be positioned along any particular strip of the print medium 109 and remains immobile when printing is performed. With reference to FIG. 4B, shown is a side view of the slide assembly 173 according to an aspect of the present invention. The side view of the slide assembly 173 offers further illustration of the slide mount approach 170.

Figure 5A:
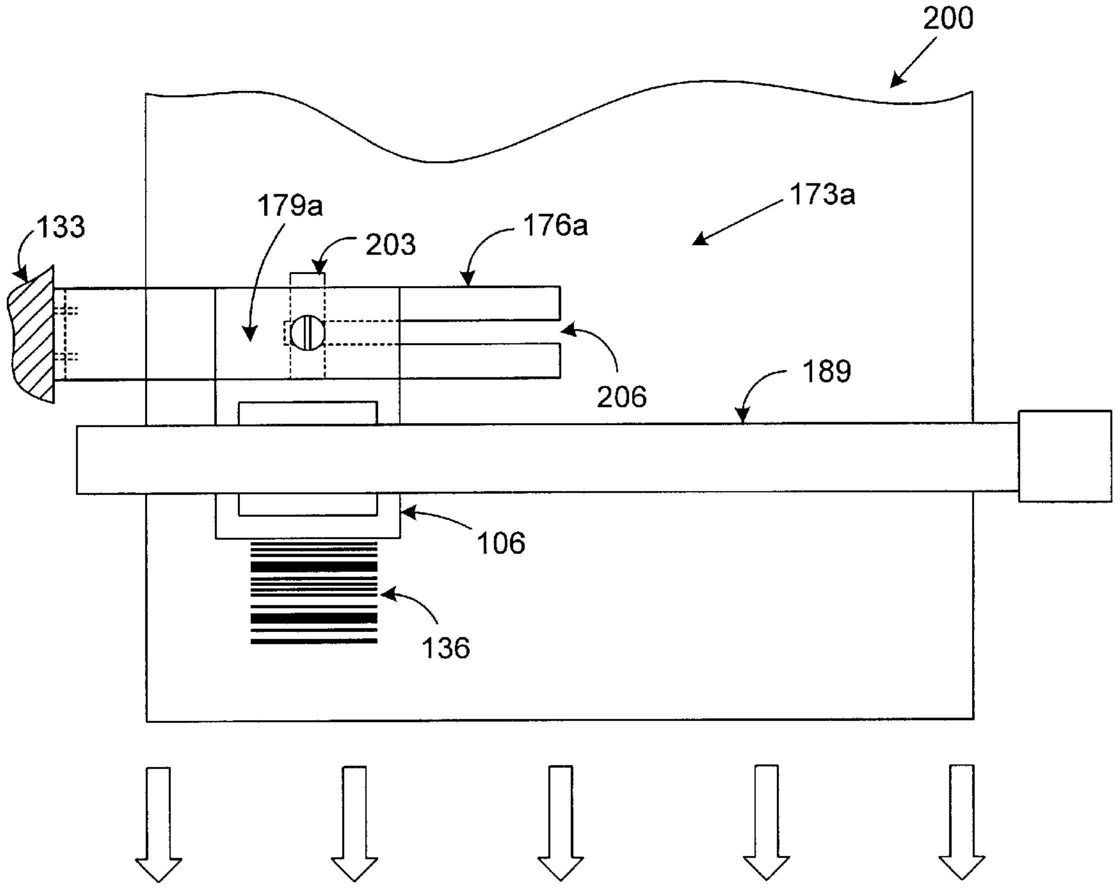
FIG. 5A is a top view of a print head assembly adjustably attached to the printer structure of the printer of FIG. 1 with a second slide assembly.

With reference to FIG. 5A, shown is a second slide mount approach 200 according to another aspect of the present invention. The second slide mount approach 200 includes a second slide assembly **173*a* with a slide mechanism 176*a* and a slide 179*a*. The second slide assembly 173*a* is employed to adjustably attach the ink jet head assembly 106 to the printer structure 133 as shown. The second slide assembly 173*a* includes a clamp 203 that fixes the slide 179*a* to the slide mechanism 176*a*. The slide mechanism 176*a* includes a long groove 206 along which the slide 179*a* may glide back and forth. By engaging the clamp 203, the slide 179*a* is fixed to a desired position along the slide mechanism 176*a*. Thus the second slide assembly 173*a* includes a flat slide mechanism 176*a* or slide plate and a clamp device 203** which differs from the slide assembly 173 (FIG. 4A).

Figure 5B:
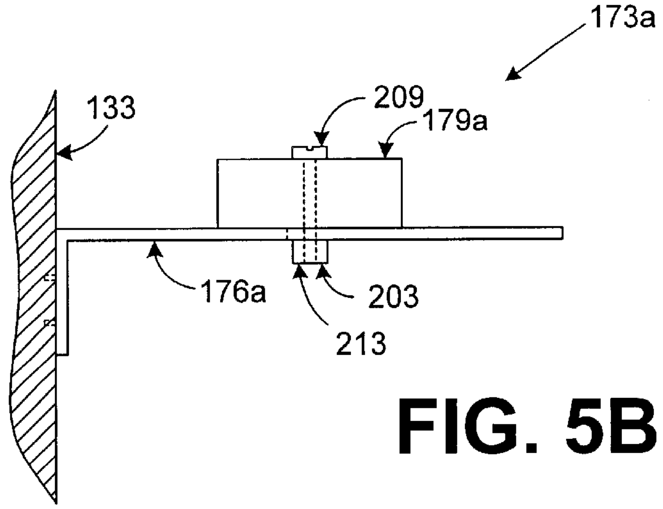
FIG. 5B is a side view of the print head assembly and the second slide assembly of FIG. 4A.

With reference to FIG. 5B, shown is a side view of the second slide assembly **173*a* that further illustrates how the slide 179*a* is fixed to the slide mechanism 176*a*. In particular, the clamp 203 includes a bolt 209 and a threaded clamp member 213. Upon tightening the bolt 209, the slide mechanism 176*a* is compressed between the slide 179*a* and the threaded clamp member 213 thereby fixing the slide 179*a* at a specific position along the slide mechanism 176*a*. However, although the particular clamp 203 is shown herein, it is generally understood by those with ordinary skill in the art that other types of clamping structures may be employed as well. The slide mechanism 176***a* is affixed to the printer structure 133 as shown.

Figure 6:
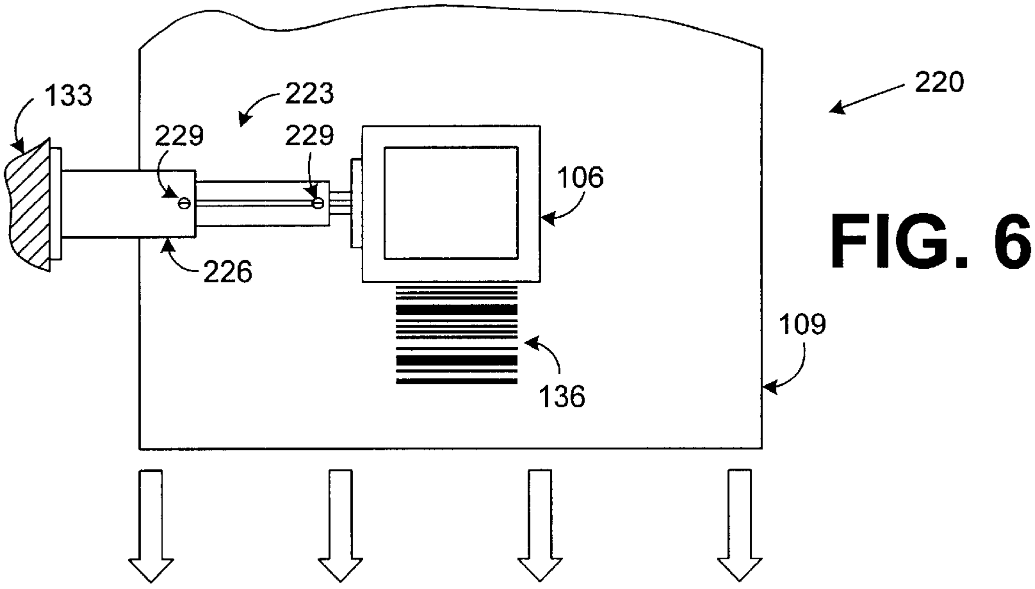
FIG. 6 is a top view of a print head assembly adjustably attached to the printer structure of the printer of FIG. 1 with a telescopic assembly.

With reference to FIG. 6, shown is a telescopic mount approach 220 according to another embodiment of the present invention. The telescopic mount approach 220 includes a telescope assembly 223. One end of the telescope assembly 223 is affixed to the printer structure 133 and the other end is affixed to the ink jet head assembly 106. In this manner, the telescope assembly adjustably attaches the ink jet head assembly 106 to the printer structure 133. The telescope assembly 223 includes telescope members 226 that may be adjusted. The position of the ink jet head assembly 106 may be determined by fixing the telescope members 226 to each other using appropriate set mechanisms 229 such as, for example, set screws and grooves, clamps, buckles, and/or other setting mechanisms. By loosening the set mechanisms 229, a user may position the ink jet head assembly 106 at a particular position along the width of the print medium 109 and thereafter may fix the position of the ink jet head assembly 106 by manipulating the set mechanisms 229.

Figure 7A:
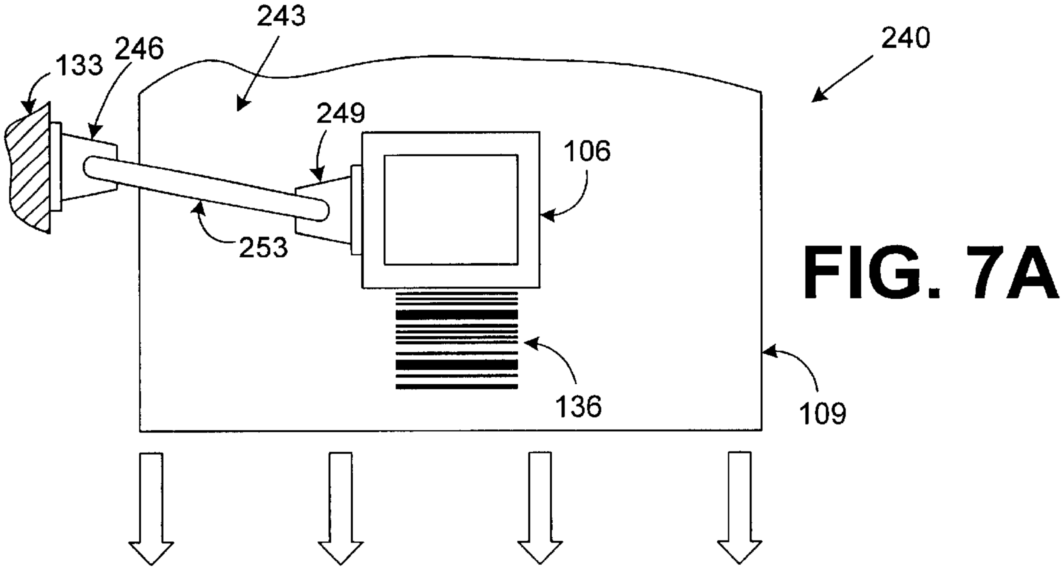
FIG. 7A is a top view of a print head assembly adjustably attached to the printer structure of the printer of FIG. 1 with a swivel arm assembly.

With reference to FIG. 7A, shown is a swivel arm mount approach 240 according to another embodiment of the present invention. The swivel arm mount approach 240 employs a swivel arm assembly 243. The swivel arm assembly 243 includes a first pivot mount 246 and a second pivot mount 249. A swivel arm 253 is coupled between the first and second pivot mounts 246 and 249. The first pivot mount 246 is affixed to the printer structure 133 and the second pivot mount 249 is affixed to the ink jet head assembly 106. In this manner, the swivel arm assembly 243 adjustably attaches the ink jet head assembly 106 to the printer structure 133. In particular, the ink jet head assembly 106 may be moved within the radius of the swivel arm 253 and thereafter the swivel arm 253 may be fixed in position thereby holding the ink jet head assembly 106 in a specific position to print along a desired column at a point along the width of the print medium 109.

Figure 7B:
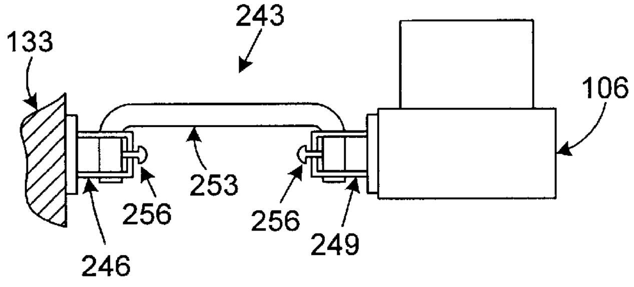
FIG. 7B is a side view of the print head assembly and the swivel arm assembly of FIG. 7A.

With reference to FIG. 7B, shown is a side view of the swivel arm assembly 243 that provides a further illustration of the operation thereof. In particular, the first and second pivot mounts 246 and 249 are shown with set screws 256 that hold the swivel arm 253 in position relative to each of the first and second pivot mounts 246 and 249 accordingly. Note that other means to hold the swivel arm 253 may be employed such as, for example, a clamp or other such device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A system for printing on a print medium, comprising:

a laser printing assembly within a printer for printing on the print medium;

an ink jet head assembly adjustably attached to a printer structure of the printer for printing a code on the print medium; and a telescopic assembly adjustably attaching the ink jet head assembly to the printer structure, the telescopic assembly including at least two telescoping members, the at least two telescoping members being fixed together with a set mechanism.

2. A system for printing on a print medium, comprising:

a laser printing assembly within a printer for printing on the print medium;

an ink jet head assembly adjustably attached to a printer structure of the printer for printing a code on the print medium; and a swivel arm assembly adjustably attaching the ink jet head assembly to the printer structure, the swivel arm assembly including a first pivot mount affixed to the printer structure and a second pivot mount affixed to the ink jet head assembly, wherein the swivel arm pivots in both of the first and second pivot mounts to move the ink jet head assembly within the radius of the swivel arm.

3. A system for printing on a print medium, comprising:

a laser printing assembly within a printer for printing on the print medium;

an ink jet head assembly attached to a printer structure of the printer for printing a code on the print medium; and a slide assembly adjustably attaching the ink jet head assembly to the printer structure, wherein the slide assembly further comprises:

a slide mechanism; and a slide adjustably attached to a position on the slide mechanism with a set mechanism, wherein the ink jet head assembly is attached to the slide, and wherein the set mechanism further comprises a set screw.

4. The system of claim 3, wherein the slide mechanism further comprises a slide bar.

5. The system of claim 3, wherein the slide mechanism further comprises a slide plate.

6. A system for printing on a print medium, comprising:

a laser printing assembly within a printer for printing on the print medium;

an ink jet head assembly attached to a printer structure of the printer for printing a code on the print medium; and a slide assembly adjustably attaching the ink jet head assembly to the printer structure, wherein the slide assembly further comprises:

a slide mechanism; and a slide adjustably attached to a position on the slide mechanism with a set mechanism, wherein the ink jet head assembly is attached to the slide, and wherein the set mechanism further comprises a clamp.

7. The system of claim 6, wherein the slide mechanism further comprises a slide bar.

8. The system of claim 6, wherein the slide mechanism further comprises a slide plate.

9. A system for printing on a print medium, comprising:

a laser printing assembly within a printer for printing on the print medium;

an ink jet head assembly immovably attached to a printer structure of the printer for printing a code on the print medium; and a bracket, the bracket immovably attaching the ink jet head assembly to the printer structure, wherein a first end of the bracket is attached to the printer structure and a second end of the bracket is attached to the ink jet head assembly; and wherein the ink jet head assembly is exposed to a column of the print medium at a position along an entire width of the print medium depending upon a length of the bracket.

10. A method for printing on a print medium, comprising:

providing a laser printing assembly within a printer for printing on a print medium;

printing on the print medium with the laser printing assembly;

immovably attaching an ink jet head assembly to a printer structure of the printer;

printing on the print medium with the ink jet head assembly; and wherein the step of immovably attaching the ink jet head assembly to the printer structure further comprises the steps of:

affixing a first end of a bracket to the printer structure;

affixing a second end of the bracket to the ink jet head assembly; and exposing the ink jet head assembly to a column of the print medium at a position along an entire width of the print medium depending upon a length of the bracket.

11. A method for printing on a print medium, comprising:

providing a laser printing assembly within a printer for printing on a print medium;

printing on the print medium with the laser printing assembly;

adjustably attaching an ink jet head assembly to a printer structure of the printer;

printing on the print medium with the ink jet head assembly; and wherein the step of adjustably attaching the ink jet head assembly to the printer structure further comprises the steps of:

affixing a slide mechanism to the printer structure;

adjustably attaching a slide to the slide mechanism with a set mechanism; and affixing the ink jet head assembly to the slide.

12. A method for printing on a print medium, comprising:

providing a laser printing assembly within a printer for printing on a print medium;

printing on the print medium with the laser printing assembly;

adjustably attaching an ink jet head assembly to a printer structure of the printer with a telescopic assembly having at least two telescoping members, the at least two telescoping members being fixed together with a set mechanism; and printing on the print medium with the ink jet head assembly.

13. A method for printing on a print medium, comprising:

providing a laser printing assembly within a printer for printing on a print medium;

adjustably attaching an ink jet head assembly to a printer structure of the printer with a swivel arm assembly having a first pivot mount affixed to the printer structure and a second pivot mount affixed to the ink jet head assembly;

adjusting the position of the ink jet head assembly by pivoting the swivel arm in both of the first and second pivot mounts to move the ink jet head assembly within the radius of the swivel arm;

holding the ink jet head assembly in a position by tightening a set mechanism in each of the first and second pivot mounts;

printing on the print medium with the laser printing assembly; and printing on the print medium with the ink jet head assembly.

* * * * *